United States Patent [19]
Davidson

[11] Patent Number: 5,871,641
[45] Date of Patent: *Feb. 16, 1999

[54] FLUID FILTER WITH PLEATED SEPTUM

[75] Inventor: Donald R. Davidson, Chatham, N.J.

[73] Assignee: H-Tech, Inc., Wilmington, Del.

[*] Notice: The term of this patent shall not extend beyond the expiration date of Pat. No. 5,591,329.

[21] Appl. No.: 952,833

[22] PCT Filed: May 30, 1996

[86] PCT No.: PCT/US96/07182

§ 371 Date: Nov. 25, 1997

§ 102(e) Date: Nov. 25, 1997

[87] PCT Pub. No.: WO96/38215

PCT Pub. Date: Dec. 5, 1996

[51] Int. Cl.⁶ .......................... B01D 29/62; B01D 37/02
[52] U.S. Cl. .................. 210/193; 210/169; 210/232; 210/136; 210/407; 210/409; 210/412; 210/456; 210/472; 210/493.5; 210/494.3; 210/413
[58] Field of Search ...................... 210/169, 193, 210/232, 407, 409, 410, 411, 412, 472, 493.1, 493.2, 493.5, 494.1, 494.3, 136, 456, 413

[56] References Cited

U.S. PATENT DOCUMENTS

| | | |
|---|---|---|
| 1,994,656 | 3/1935 | Liddell . |
| 2,218,800 | 10/1940 | Williams . |
| 2,221,210 | 11/1940 | Soderquist . |
| 2,338,418 | 1/1944 | Forrest et al. . |
| 2,367,935 | 1/1945 | Franck . |
| 2,401,222 | 5/1946 | Briggs . |
| 2,914,179 | 11/1959 | Foust . |
| 2,970,699 | 2/1961 | Leuthesser et al. . |
| 2,988,227 | 6/1961 | Harms . |
| 3,096,281 | 7/1963 | Smith et al. . |
| 3,100,190 | 8/1963 | Hobson, Jr. . |
| 3,165,472 | 1/1965 | Briggs . |
| 3,291,310 | 12/1966 | Marvel . |
| 3,302,796 | 2/1967 | Downey . |
| 3,334,753 | 8/1967 | Royer et al. . |
| 3,365,065 | 1/1968 | Varjabedian . |
| 3,385,038 | 5/1968 | Davis . |
| 3,465,413 | 9/1969 | Rosaen et al. . |
| 3,512,647 | 5/1970 | Young . |

(List continued on next page.)

FOREIGN PATENT DOCUMENTS

| | | |
|---|---|---|
| 2159725 | 2/1988 | Br. Indian Ocean Ter. ... B01D 29/38 |
| 1153724 | 1/1961 | Germany . |
| 9303566 | 7/1993 | Germany . |
| 829141 | 8/1979 | Russian Federation . |
| 492470 | 8/1970 | Switzerland ................ B01D 37/02 |
| 9638215 | 12/1996 | WIPO ......................... B01D 37/02 |

OTHER PUBLICATIONS

"Chemical Engineering: Getting the most out of filteraids", by Arthur J. Basso, Chemical Engineering, Sep. 12, 1977.
Product literature pertaining to "Hayward Micro Clear DE Vertical Grid Filter Series", copyrighted 1986 by Hayward Pool Products, Inc.

Primary Examiner—Robert Popovics
Attorney, Agent, or Firm—Selitto & Associates

[57] ABSTRACT

A device for filtering fluid includes a hollow housing (10) having a fluid inlet (26) and a fluid outlet (28). A filter element (50) formed of fluid permeable material is disposed within the housing (10) for filtering fluid entering the fluid inlet (26), the fluid passing through the element (50) and out the fluid outlet (28). The element has a generally cylindrical configuration with the permeable material forming a plurality of elongated, radially extending pleats (98). The pleats are supported by spacers (81) having a plurality of blades (102) attached to a web (106) with channels (104) therebetween. The element (50) is used as a septum for supporting a diatomaceous earth precoat. A regeneration piston (76) creates fluid flows within the filter that cause the element (50) to flutter, thereby displacing the diatomaceous earth precoat from the septum for regeneration.

35 Claims, 10 Drawing Sheets

U.S. PATENT DOCUMENTS

| | | | |
|---|---|---|---|
| 3,679,052 | 7/1972 | Asper . | |
| 3,735,872 | 5/1973 | Anderson . | |
| 3,753,872 | 8/1973 | Kohl et al. . | |
| 3,774,772 | 11/1973 | Yeths | 210/169 |
| 3,807,150 | 4/1974 | Maracle . | |
| 4,075,106 | 2/1978 | Yamazaki | 210/487 |
| 4,153,552 | 5/1979 | Muther | 210/108 |
| 4,156,651 | 5/1979 | Mehoudar | 210/412 |
| 4,488,966 | 12/1984 | Schaeffer | 210/493.5 |
| 4,560,477 | 12/1985 | Moldow | 210/457 |
| 4,619,676 | 10/1986 | Turck | 210/493.1 |
| 4,652,369 | 3/1987 | Depolo et al. | 210/169 |
| 4,680,118 | 7/1987 | Taga | 210/493.1 |
| 4,710,297 | 12/1987 | Suzuki et al. | 210/493.2 |
| 4,798,670 | 1/1989 | Treene | 210/169 |
| 4,810,379 | 3/1989 | Barrington | 210/232 |
| 4,812,230 | 3/1989 | Gerulis | 210/411 |
| 4,906,357 | 3/1990 | Drori | 210/411 |
| 4,906,373 | 3/1990 | Drori | 210/331 |
| 4,919,801 | 4/1990 | Hobson, Jr. | 210/232 |
| 4,921,600 | 5/1990 | Meissner | 210/169 |
| 4,923,601 | 5/1990 | Drori | 210/193 |
| 4,935,126 | 6/1990 | Drori | 210/193 |
| 4,944,887 | 7/1990 | Frederick | 210/193 |
| 4,954,255 | 9/1990 | Miller et al. | 210/493.5 |
| 5,013,161 | 5/1991 | Zaragoza et al. | 374/208 |
| 5,013,438 | 5/1991 | Smith | 210/493.1 |
| 5,013,461 | 5/1991 | Drori | 210/193 |
| 5,030,349 | 7/1991 | Drori | 210/411 |
| 5,074,999 | 12/1991 | Drori | 210/411 |
| 5,092,990 | 3/1992 | Muramatsu et al. | 210/193 |
| 5,098,565 | 3/1992 | Drori | 210/346 |
| 5,112,481 | 5/1992 | Drori | 210/193 |
| 5,176,829 | 1/1993 | Drori | 210/346 |
| 5,186,825 | 2/1993 | Drori | 210/411 |
| 5,186,829 | 2/1993 | Janik | 210/232 |
| 5,213,684 | 5/1993 | Drori | 210/346 |
| 5,316,676 | 5/1994 | Drori | 210/411 |
| 5,328,604 | 7/1994 | Drori | 210/232 |
| 5,389,243 | 2/1995 | Kaplan | 210/193 |
| 5,393,423 | 2/1995 | Drori | 210/411 |
| 5,397,465 | 3/1995 | Stewart | 210/193 |
| 5,591,329 | 1/1997 | Davidson | 210/193 |

FLUID FILTER WITH PLEATED SEPTUM

TECHNICAL FIELD OF THE INVENTION

The present invention relates to fluid filtering devices, and more particularly to diatomaceous earth filters employing a septum.

BACKGROUND ART

Various fluid filtering devices have been proposed over the years, the more common types employing a porous filter media which is penetrable to the fluid to be filtered but substantially impenetrable to contaminants to be filtered out. A flow of fluid is directed through the media such that contaminant particles which do not pass through the pores of the filter media are retained on or in the media on the upstream side. Purified fluid passes through the media and on to its end use downstream. The pore size of the media determines the fineness of filtration or, conversely, the size of the contaminant particles which pass through the media and are not filtered out. After a period of filtration, contaminants collected on the upstream side of the media plug or clog the media such that fluid flow through the media is reduced and/or the pressure differential between the fluid on the upstream side of the media and the fluid on the downstream side is increased to an unacceptable level. Decreased flow translates to a reduction in purified fluid output, whereas an increase in differential pressure generally signifies greater strain on the fluid systems producing the fluid flow to the filter, such as pumps, piping and seals, accelerating their wear and consuming more energy. For this reason, fluid filtration systems typically have some provision for unclogging the filter media at regular intervals. This may take the form, inter alia, of reverse flushing the media to waste, replacing the media with new media, subjecting the media to some form of mechanical cleaning process such as scraping or brushing, or a combination of the foregoing methods, depending upon the media employed.

There are numerous kinds of filter media, with each type having its advantages and disadvantages with respect to filtering efficiency, backwashing/cleaning effectiveness and cost. For example, cartridge filters typically employ a filter element fabricated from a fibrous or woven sheeting material, such as a paper, felt, fiberglass, woven fabric or screen-like material surrounding a central, perforated core cylinder and capped with end plates. Cartridge filters are light in weight, compact and effective at removing small particulates. Fluid flow is commonly directed from the outside of the cartridge element, which usually approximates a cylindrical shape, to an inside core cylinder. The fluid permeable sheeting typically serves as the filter media itself and may be backflushable. In order to increase the filter media surface area, it is known to fold the media sheet in a continuous zig-zag or accordion pattern. Cartridge filters have certain inherent drawbacks, such as becoming clogged by fine particulates or organics that resist backflushing. Cartridges also tend to collapse as the flexible media sheet experiences greater pressure differentials. This collapse may take the form of a general deformation of the overall cylindrical shape of the cartridge or the collapse of the peripheral folded zig-zag pattern such that the surface area advantage provided by the folding is defeated. Cartridge collapse has been remedied in the past by the inclusion of a parallel metal screening bent in the same shape as the media sheeting. Solutions for the latter problem of the pinching down of the folds have been proposed in the form of corrugated fold separators made from rigid plastics as shown, e.g., in U.S. Pat. Nos. 4,075,106 to Yamazaki and 4,560,477 to Moldow. Because cartridge media becomes blocked under certain circumstances, the only remedy to restore the media is replacement, which is both expensive and inconvenient, in that the cartridges are the products of rather complex fabrication methods and to replace them, the filter must be disassembled.

As an alternative to filtering media in the form of woven or flocked sheeting, many filtering systems use a granular or particulate media, such as sand or diatomaceous earth, hereinafter "DE", as the primary media for collecting contaminants. The primary media is prevented from entering the fluid flow by an element which is porous to the fluid to be filtered yet impenetrable to the granular media, e.g., a fine mesh screen or a sintered filter block. The granular media collects the contaminants from the fluid stream thereby protecting the media-impenetrable element from becoming clogged by contaminants. That is, the fluid to be filtered passes through a filter bed or cake of granular media and then through the media-impenetrable element, on to its final use downstream. For example, a DE filter typically contains at least one septum which is a porous, fabric-like element that is penetrable to the fluid to be filtered but not to DE. The septum has pores with dimensions which preclude the DE from entering the filter stream in significant amounts after a precoating of DE has been deposited thereon. Usually, the pore size of the septum is larger than the particle size of the DE to promote flow and to insure that the finest filtration takes place in the DE precoat. Even though the primary media has particles which are smaller than the septum pores, unacceptable leakage of primary media through the septum is avoided due to the interlocking and agglomeration of DE particles to form groups which are larger than the pores in the septum. In this manner, the DE precoating or filter cake protects the fine pores of the septum from blockage by dirt. It is therefore desirable, for any given grade of DE, that the septum holes be significantly larger than the DE particle size. Septum pores that are too large however, result in unacceptable leakage of DE past the septum and prolonged periods of time for establishing a precoat. DE is deposited upon the septum by introducing it into the fluid stream, typically in a slurry, such that it is deposited upon the septum by fluid flow therethrough forming a filter cake or layer of DE on the septum. The septums of DE filters may take various forms and are frequently disposed about a spacer of some sort which internally supports the septum as, e.g., shown in U.S. Pat. Nos. 3,774,772 to Yeths (arcuately-shaped), and 3,100,190 to Hobson. Jr. (tube-shaped).

The use of granular filter media like DE and sand has certain benefits, e.g., both are relatively inexpensive materials and tend to pack quite closely giving fine filtration results. As with all filters, however, after a period of use, contaminants and dirt accumulate on the upstream side of the granular filter media. Granular media typically has a range of particle sizes and shapes, thus giving rise to a spectrum of pore sizes in any given sample. Smaller dirt particles have a greater tendency to penetrate the surface of the granular media bed or cake until being trapped by a smaller pore below the surface. This gives rise to a contaminated band of media extending from the surface into the depth of the media. Eventually, the accumulation of dirt causes a resistance to flow and an increase in operating pressure indicating a need to change the filter media or to clean the accumulated dirt therefrom in order to permit a resumption of normal flow rates. A common method for cleaning dirt from DE filters is by backwashing, wherein a reverse flow of fluid is directed through the septum to dislodge accumulated dirt, as well as, the DE filter cake from the septum. The reverse backflushing flow, with dirt and DE filter media included, is directed to waste, such that there is a loss of fluid and DE associated with a removal of dirt from the filter. In this day of ever increasing eco-consciousness, the disposal of DE in the course of backflushing filters, e.g., on swimming pools, has received increased negative scrutiny.

As an alternative to backflushing, it has been recognized that the DE filter media may be given extended filtering life by reorienting the filter cake on the septum without backflushing or disposing of the DE. For example, U.S. Pat. No. 5,013,461 to Drori discloses a DE filter with a centrally located piston for creating reverse flows for dislodging DE filter cake from the exterior surface of a laminated disk filter element. Similar piston arrangements are shown in U.S. Pat. Nos. 4,156,651 to Mehoudar and 1,994,656 to Liddell. U.S. Pat. No. 3,735,872 to Anderson discloses apparatus for regenerating the DE precoat using the resiliency of foam septum elements underlying the precoat, by scraping and by classifying the dislodged DE into a precoat of graduated particles. Even without the affirmative step of classifying, reorienting "opens up" the filter cake by breaking up the surface coating of dirt that clogs the DE filter cake. Reorienting disperses the dirt throughout the DE layer taking advantage of the improbability that the filter cake and dirt will reassume an orientation of particles packed so closely together as to unduly restrict fluid flow therethrough. The step of reorienting the DE without backflushing involves a cessation of filter operation, disturbing the DE filter cake and filtered dirt from the septum in some manner, and resuming filtering operation, such that the DE and the dirt are redeposited upon the septum in a new orientation. Reorientation will typically result in some portion of the DE and some portion of fine dirt which is smaller than the pores in the septum being introduced into the filtered fluid stream unless the fluid flow is directed to waste upon restarting.

Another limitation associated with DE filters is the tendency for the DE to coat the septum unevenly, wherein some portions are not coated sufficiently and other portions are coated excessively. This is due to the "bridging" of DE between adjacent surfaces of the filter element or "drifting" of the DE creating areas of the septum where a thick impervious layer of DE has been deposited due to the septum shape and its interaction with the hydrodynamic flows within the filter.

It is therefore an object of the present invention to provide an improved fluid filter having an element which exhibits an increased filtering surface area that is resistant to collapse or reduction of filter surface area under high differential pressures. It is a further object to provide a diatomaceous earth filter which avoids bridging and is provided with apparatus to regenerate the DE precoat without backwashing.

DISCLOSURE OF THE INVENTION

The problems and disadvantages associated with the conventional techniques and devices utilized to filter fluids are overcome by the present invention which includes a hollow housing having a fluid inlet and a fluid outlet. A filter element formed of fluid permeable material is disposed within the housing for filtering fluid entering said fluid inlet, the fluid passes through the element and out the fluid outlet. The element has a generally cylindrical configuration with the permeable material forming a plurality of elongated, radially extending pleats.

BRIEF DESCRIPTION OF THE DRAWINGS

For a better understanding of the present invention, reference is made to the following detailed description of an exemplary embodiment considered in conjunction with the accompanying drawings, in which.

BEST MODE FOR CARRYING OUT THE INVENTION

Figure 1:
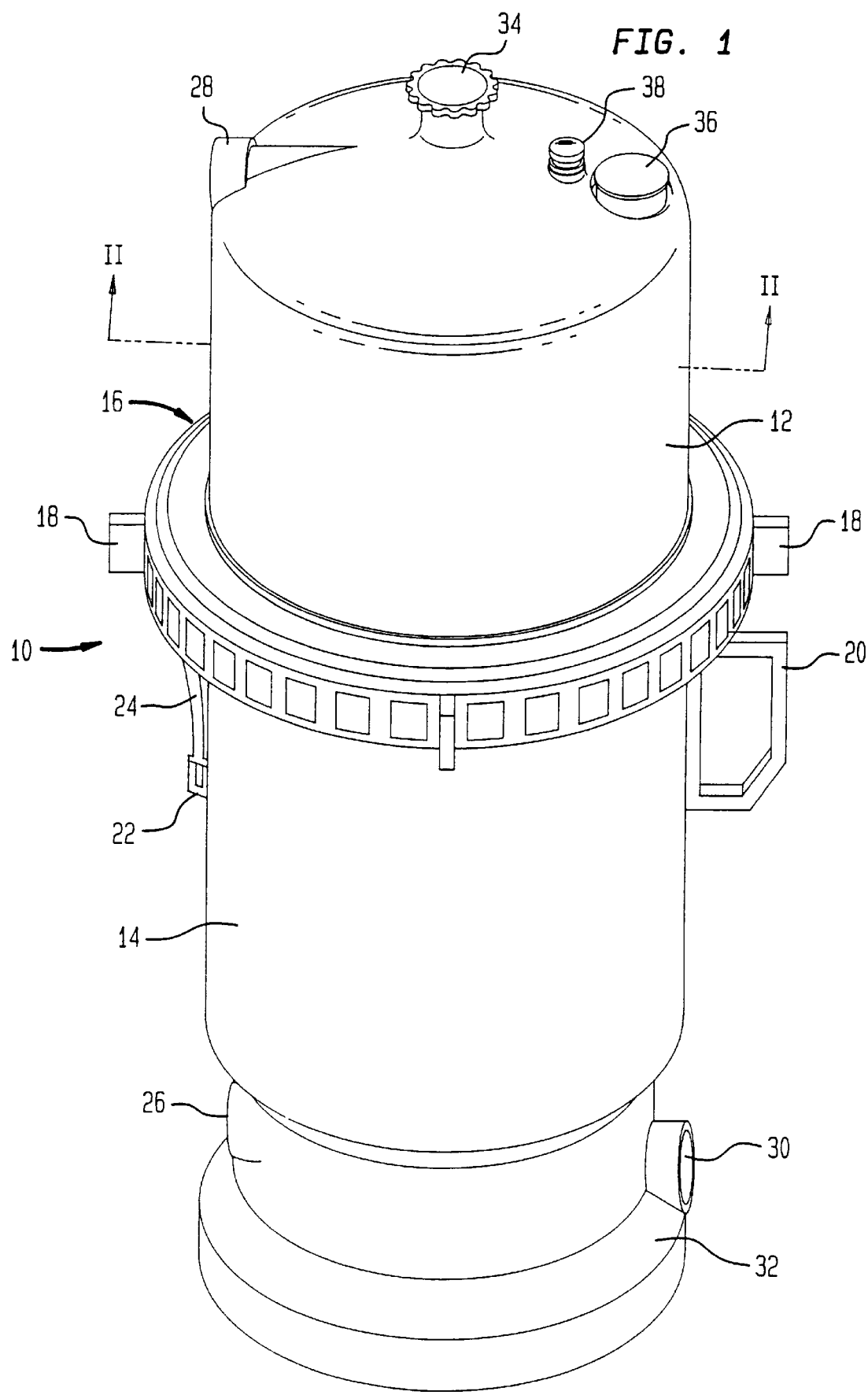
FIG. 1 is a perspective view of a filter in accordance with an exemplary embodiment of the present invention.

FIG. 1 shows a filter 10 in accordance with the present invention having a head portion 12 and a body portion 14. An internally threaded lock ring 16 coacts with threads provided on the upper end of the body portion 14 to draw the head portion 12 into secure, water-tight engagement therewith. The lock ring 16 is knurled or molded with a gripping surface and is provided with gripping tabs 18 to facilitate rotating the ring 16 by hand. A stationary gripping tab 20 projects from the body portion 14 to provide a solid fulcrum against which the hand of the user may be braced to exert pressure against the gripping tabs 18 of the lock ring 16. The gripping tabs 20, 18 on the body portion 14 and the lock ring 16 are preferably located at those degrees of angular displacement of the ring 16 where the greatest resistance to turning is experienced, i.e., at the point of final tightening and initial loosening.

A latch mount 22 protrudes from the body portion 14 for accommodating the insertion of a flexible shaft 24 functioning as a latch which is displaced by a ramp on the lock ring 16 until it overrides the ramp edge, thereby locking the ring 16 in position such that it can not be unloosened by hydraulic pressure or vibration. To remove the lock ring 16, the latch 24 may be displaced by bending it out of engagement with the ramp extending from the lock ring 16. The latch mount 22 provides a hand grip against which a hand of the operator may be braced when the lock ring 16 is removed or installed. The filter 10 has an inlet port 26, an outlet port 28 and a drain port 30. The body portion 14 has an integral, bell-shaped base 32. A piston knob 34 at the top of the filter 10 connects to a piston rod and piston for regenerating the filter media, as shall be described below. A conventional pressure gauge 36 and bleed valve 38 are also located on the top of the filter head 12. The filter body 14, head 12 and lock ring 16 may be formed from a tough plastic, such as polypropylene or ABS, in a conventional injection molding process.

Figure 2:
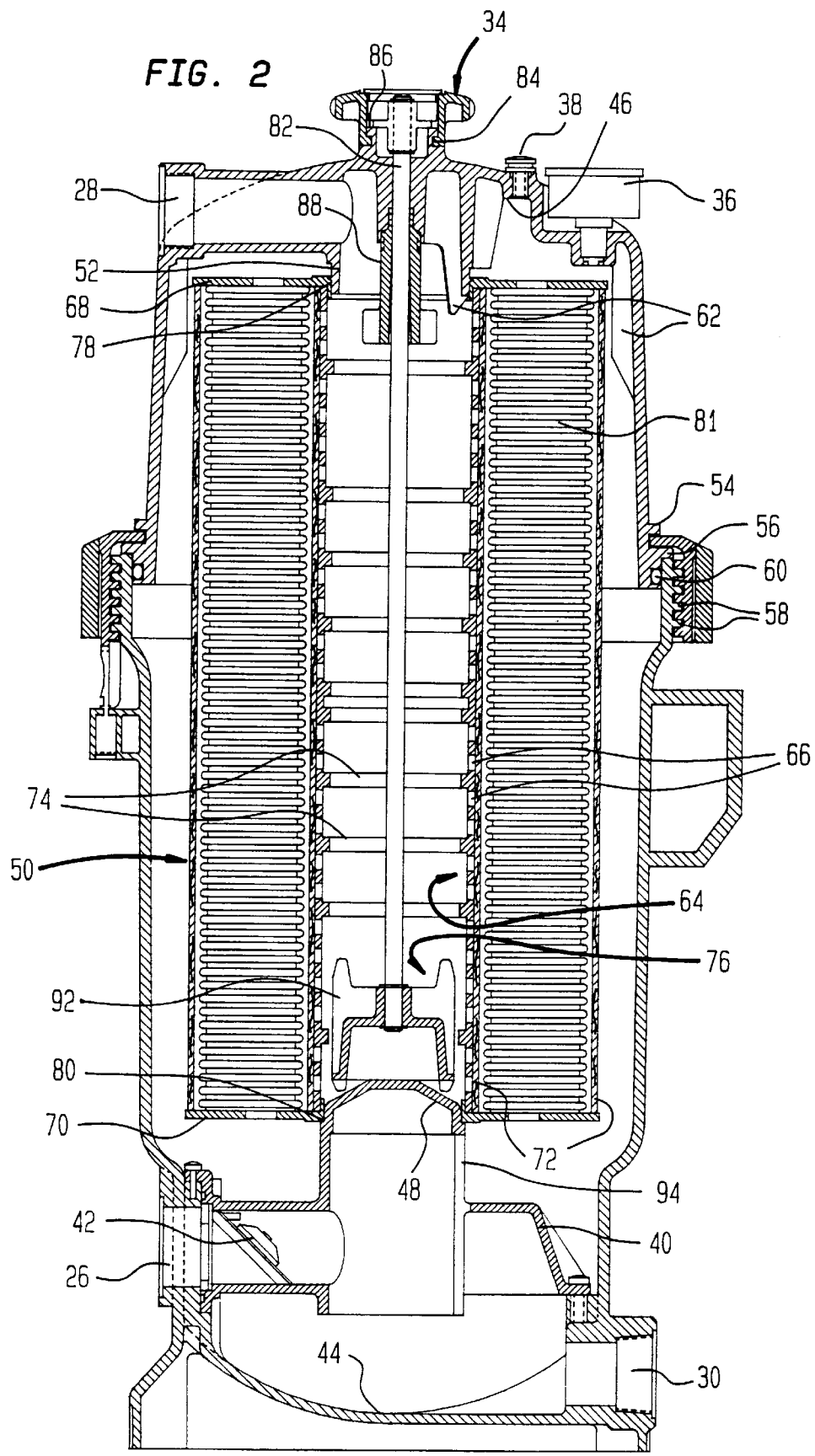
FIG. 2 is a cross-sectional view of the filter shown in FIG. 1, taken along section line II—II and looking in the direction of the arrows.

FIG. 2 shows that the inlet port 26 discharges into a flow deflector 40 having a one-way check valve 42. The flow deflector 40 redirects the inlet fluid stream downward into the hemispherical interior base surface 44 of the filter. Fluid inflow fills the interior hollow of the filter from the base surface to the top interior surface 46 of the head portion 12. On startup, the bleed valve, 38 aids the discharge of air from the filter system to admit fluid. The bleed valve 38 also facilitates draining the filter 10 of fluid for disassembly and cleaning. The flow deflector 40 also serves as a bottom mounting hub 48 for the filter element 50.

The head portion 12 has a raised annular upper mounting hub 52 coaxially located relative to the bottom mounting hub 48, with a relative spacing therebetween to sealingly receive and engage the filter element 50 therebetween when the head portion 12 is fully engaged with the body portion 14 by the action of the lock ring 16. As can be observed, the lock ring 16 is held upon the filter head 12 by a pair of flanges 54, 56. The filter head 12 is shaped and sized to be slidably received within the upper opening of the filter body 14 in piston/cylinder fashion. When the head 12 is inserted into the body 14, the lock ring 16 comes into engagement with the mating threads 58 of the body 14 providing a means for the user to urge the sealing ring 60 down into the filter body 14 in sealing engagement. The sealing ring 60 is deformed when the head 12 is urged into the body 14 such that it assumes an oval cross-sectional shape, as depicted. The upper annular flange 54 capturing the lock ring 16 assists in the removal of the head 12 from the body 14 via the action of the lock ring 16 against it, as the lock ring 16 is unthreaded. The gradual threaded action of the lock ring 16 therefor provides a controlled mechanical advantage to overcome the frictional forces exerted by the head 12 and sealing ring 60 against the body 14 in both installing and removing the head portion 12 of the filter.

The upper interior surface 46 of the head portion 12 includes several guide vanes 62 to assist in maintaining proper filter element 50 orientation while installing the head 12 onto the body portion 14. More specifically, the tapered guide vanes 62 have sloped surfaces to guide the filter element 50 into position as the head 12 is lowered onto the body 14 without the need to visualize the element 50. The filter element 50 can be seen to include a central core cylinder 64 having numerous perforations 66, a pair of end caps 68, 70 and a porous septum 72 retained therebetween. The core cylinder 64 may be fabricated from plastic, ceramic or metal and includes, in the embodiment depicted, a plurality of internal, integrally molded strengthening rings 74. The rings 74 also have a guidance function relative to the movement of the piston 76, as described below. The end caps 68, 70 may similarly be formed from metal, rubber or plastic, but in the embodiment shown, are formed of a rubber, such as urethane. Urethane end caps 68, 70 are stiff enough to provide rigidity and strength to the filter element 50 while providing sufficient flexibility to form integral seals 78, 80 at the top and bottom openings of the filter element 50 for sealing against the mounting hubs 48, 52. The urethane end caps 68, 70 also provide a convenient method for sealing the septum 72 to the end caps 68, 70, viz., the end caps 68, 70 are sequentially formed by injection into a mold already containing the septum 72 and core cylinder 64, such that the urethane flows around the septum and core cylinder.

The septum 72 may be composed of a spun bonded polypropylene netting or may be formed from any flexible woven fabric or screening, such as, e.g., polyester screening. Polypropylene is a particularly advantageous material for forming the septum 72 in accordance with the present invention, due to its stiffness and smooth surface. The stiffness of the polypropylene assists the septum in retaining its pleated configuration and in bridging the blades of the spacers 81, as described more fully below, as well as the space between pleats. The smooth surface of the polypropylene facilitates DE regeneration, in that DE is more easily removed from a smooth surface than a rough one. Septum spacers 81 may be employed to insure that the septum retains its shape under operating conditions.

In filtration mode, fluid entering the inlet port 26 fills the annular space between the filter element 50 and the interior of the filter 10. Fluid then passes through the filter element, i.e., the septum 72 and any precoat deposited thereon, e.g., DE, through the perforations 66 in the core cylinder 64, up through the cylinder and out the outlet port 28. For traditional backwashing, a reverse flow is induced, such that DE and dirt are washed from the outer surface of the septum 72 and out to waste e.g., through drain port 30. In the embodiment depicted, provision is made for regenerating a DE precoat without backwashing. A piston 76 disposed within the core cylinder 64 is affixed to a piston rod 82 which extends through the filter head 12 and receives a piston knob 34 to be gripped by the user when the piston 76 is actuated to regenerate the DE filter cake.

The piston knob 34 includes locking fingers 84 that extend downwardly and inwardly to grip mating prominences on a locking flange 86 which is described and illustrated more fully below in reference to FIG. 8. The locking fingers 84 of the piston knob 34 prevent the fluid pressure within the filter from causing the piston 76 to be pushed upwards, thereby undesirably effecting fluid filtering. The piston rod 82 is sealed by a gland nut 88 and suitable packing.

In the embodiment shown, the piston 76 has a diameter approximating that of the internal stiffening rings 74 and a height somewhat greater than the spacing between adjacent rings 74. The strengthening ribs 92 of the piston 76 have an inwardly inclined bevel, which, along with the height of the piston 76, assure that it traverses the core cylinder's internal rings 74 without binding, by bridging from one internal ring 74 to the next. In this manner, the piston is retained in the approximate center of the core cylinder 64. The piston 76 has a stroke extending from the bottom stroke position shown, to a position where the top surface of the piston 76 contacts the gland nut 88. As noted above, a pressure gauge 36 and bleed valve 38 are provided.

Figure 3:
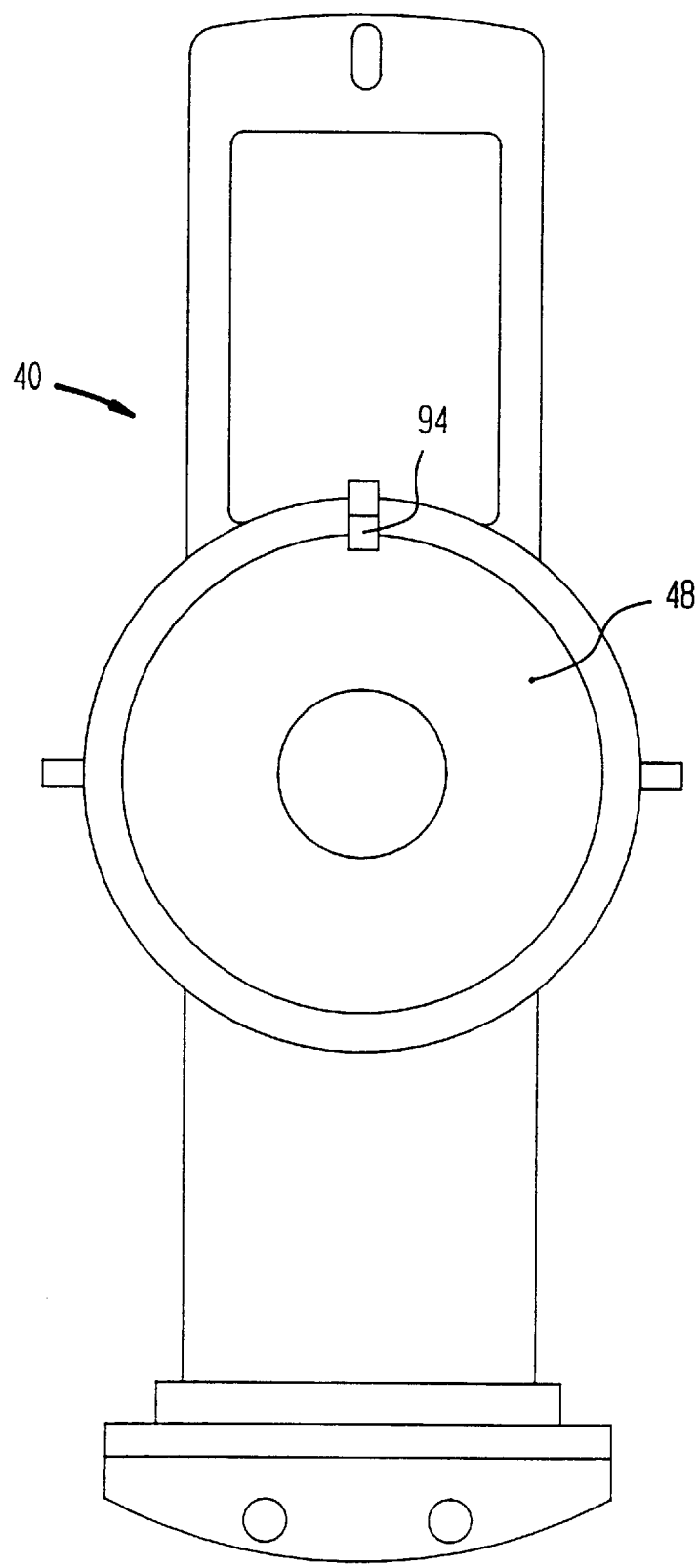
FIG. 3 is a bottom, plan view of the flow deflector portion of the filter shown in FIG. 2.
Figure 6:
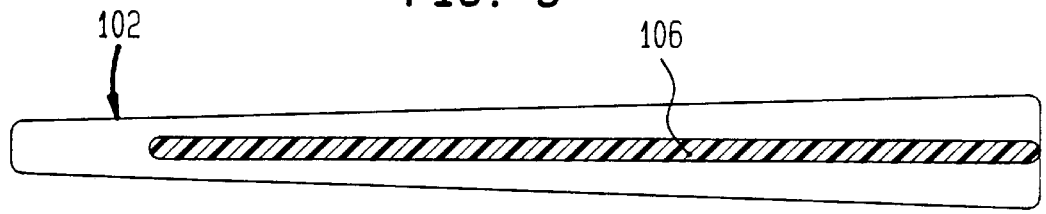
FIG. 6 is a cross-sectional view of the spacer of FIG. 5 taken along section line VI—VI and looking in the direction of the arrows.

FIG. 3 shows the flow deflector 40 from the bottom. As can be appreciated from this view, the flow deflector 40 does not partition the bottom portion of the body 14 into chambers, but instead, is more in the nature of a outlet around which fluid flow may take place. The round mounting hub 48 is disposed in the approximate center of the flow deflector. An air relief slot 94 provides a passageway for air to escape from the interior dome of the mounting hub 48 and bubble up into the filter to be removed from the filter by bleed-off or passage through the filter. This is a safety feature, in that air that is permitted to accumulate in any pockets within the filter can serve as an blades 102 shown in FIG. 6 is equivalent to the plan view shape of the septum pleat 98 shape. A web 106 extends between the blades 102.

Figure 7A:
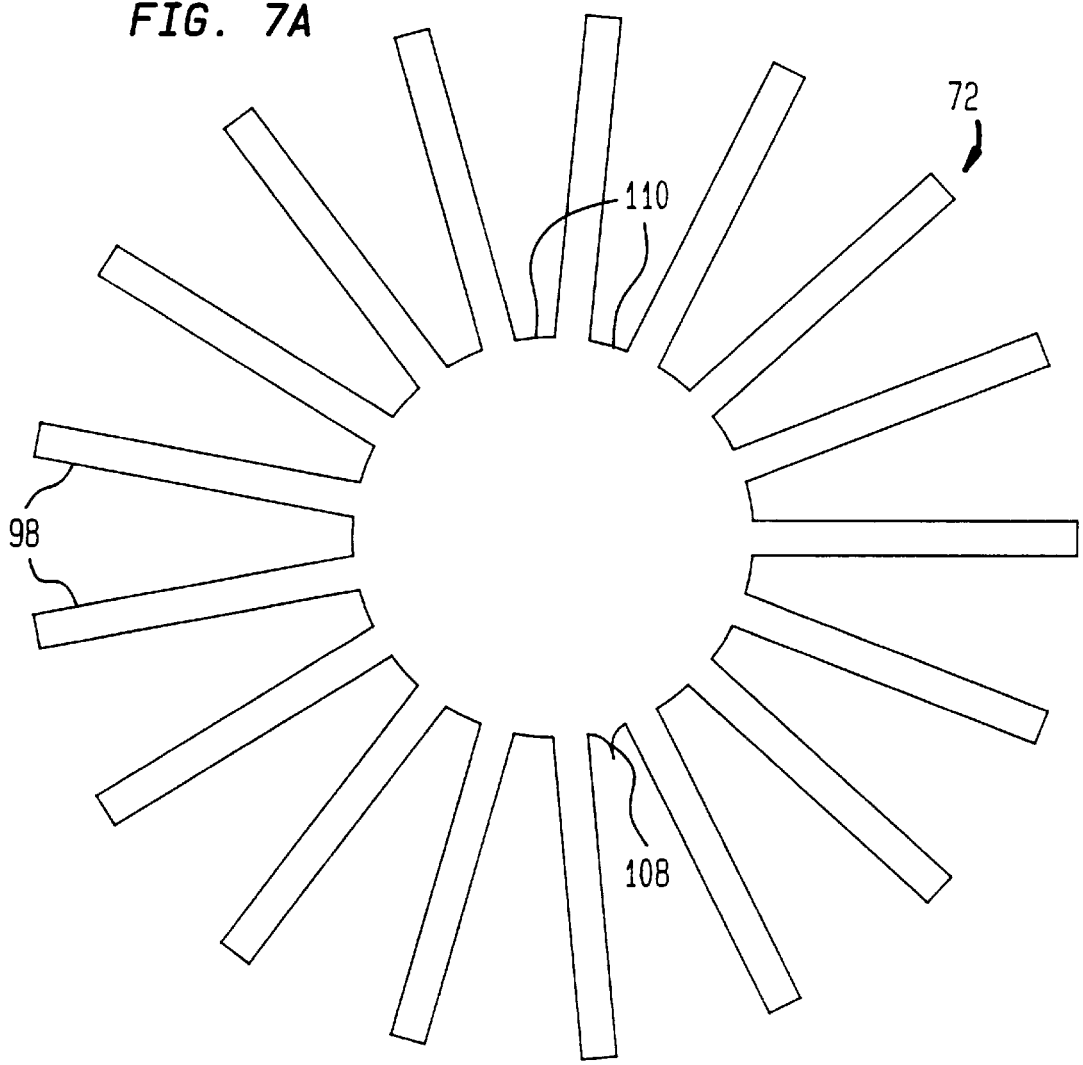
FIG. 7A is a plan view of the filter element septum shown in FIG. 4, FIGS. 7B and 7C are alternative embodiments of the septum shown in FIG. 7A.
Figure 7C:
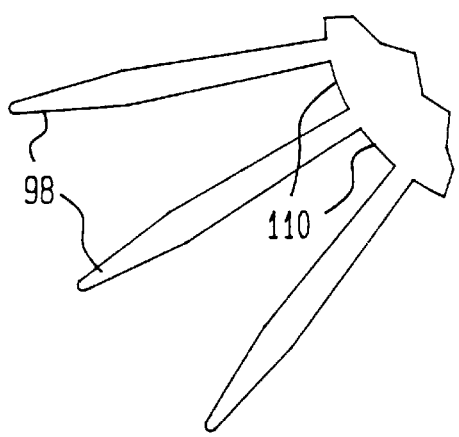
Figure 7B:
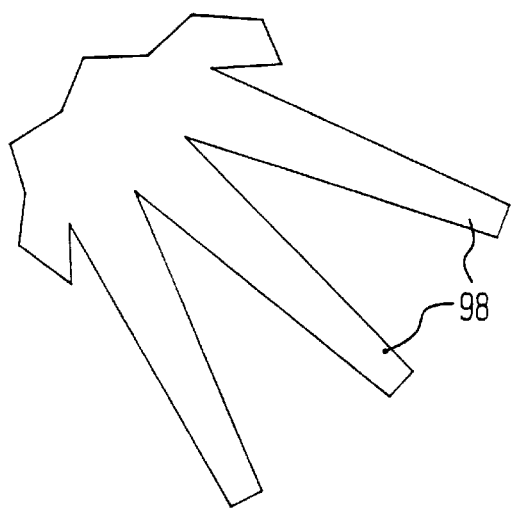
Figure 9:
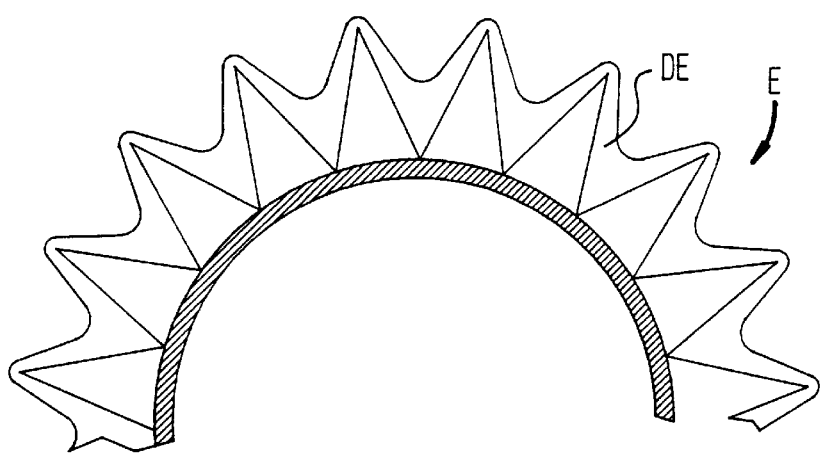
FIG. 9 is a diagrammatic, plan view of a segment of a prior art cartridge filter element configuration precoated with diatomaceous earth.

FIGS. 7A through 7C show a three different embodiments for the septum pleat 98 shape. As can be appreciated from FIG. 7A, the septum 72 includes a plurality of projections or pleats 98 emanating from the center and projecting radially outward. The pleats are formed by folding a sheet of septum material and binding the loose ends together at the seam 108. In contrast to prior art corrugated cartridge filters, e.g., as shown in FIG. 9, each pleat 98 in the present invention is separated one from another by an intermediate portion or link 110 of septum material proximate the origin of the pleat 98 near the core of the septum 72/element 50. In contrast, and as depicted in FIG. 9, the media sheeting of prior art corrugated filter elements converge to a sharp edge at the origin of each successive corrugation. If used as a DE filter element septum, the convergence of the corrugations of prior art elements results in bridging and drifting of the DE into the converging edges of the element. This results in an uneven coating of the septum wherein portions at the apogee of the corrugations are insufficiently coated allowing contamination of the septum, and portions near the converging inner edges that are too heavily coated, reducing fluid flow.

One might also observe that a septum shape in accordance with the present invention results in a smaller septum surface area than a simple, densely packed zig-zag corrugation pattern for a given cylindrical volume of space for the element to occupy. This is due to the elongated trapezoidal accumulator for energy during the operation of the filter and should therefore be eliminated to prevent an uncontrolled release of pressure.

Figure 4:
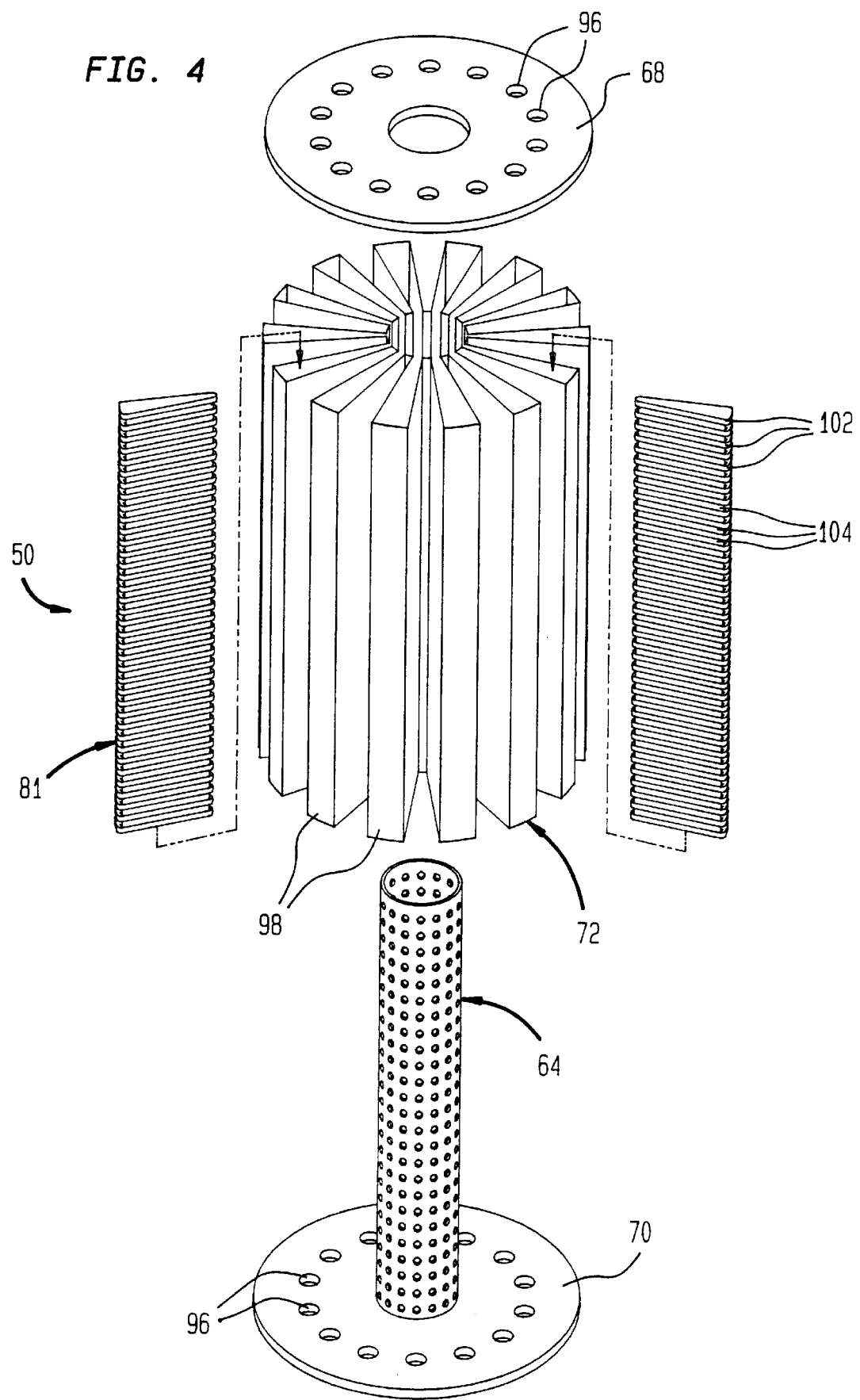
FIG. 4 is an exploded, perspective view of the filter element of the filter shown in FIG. 2.

FIG. 4 shows the filter element 50 with perforated core cylinder 64, pleated septum 72 and vented end caps 68, 70. The vent holes 96 in the end caps 68, 70 are provided for filters using a precoat of granular filter media, such as DE filters. In such embodiments, the vent holes 96 are disposed between the pleats 98 of the septum 72, described more fully below, such that filter flow will be directed through the vent holes 96 to clear excess DE from between septum pleats 98 and eliminating drifting and bridging of DE between septum pleats. Bridging is also reduced by the vent holes 96 due to the DE sloughing from the septum 72 when the filter 10 is turned off. The vent holes 96 permit the fallen DE to drain through the end cap 70 from between the septum fingers 98 into the bottom of the filter 10. Upon resuming filtration, the sloughed DE is carried by the filtering flow of fluid to evenly coat the septum 72.

Figure 5:
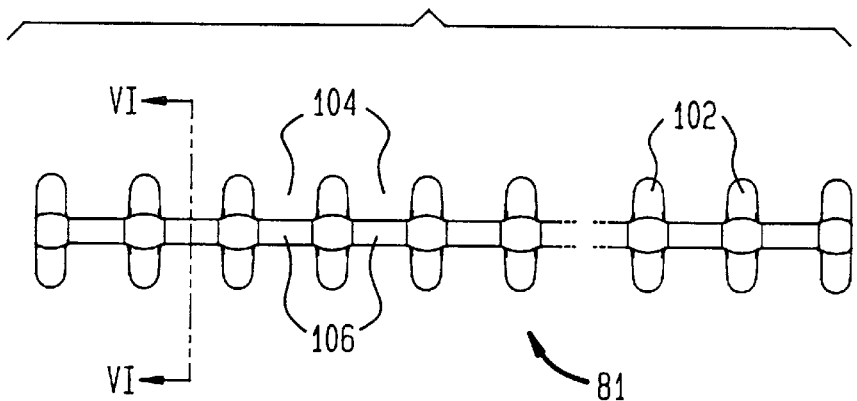
FIG. 5 is an elevational, end-on view of a septum spacer shown in FIG. 4.

FIG. 4 also shows septum pleat spacers 81 which are substantially rigid members that slide into the septum pleats 98 to allow them to retain their overall shape when subjected to the pressures of filtration and the increased differential pressures associated with a clogged condition. The spacers 81 have a plurality of blades 102 and channels 104 therebetween to channel fluid toward the core cylinder 64 to enable normal fluid flow through the element 50. FIGS. 5 and 6 illustrate a septum pleat spacer 81 which has a plurality of spaced blades 102 and channels 104 therebetween. The plan view shape of the shape of the pleats 98, wherein the outer end of the pleat has a greater width than the inner end and to the spacing between pleats on the inner circumference of the element. Nevertheless, due to the avoidance of bridging effects, a precoated septum in accordance with the present invention will have an equivalent or greater surface area as compared to a simple corrugated element.

FIG. 7B shows an alternative embodiment which is essentially a combination of the box-shaped pleat 98 of the present invention with the converging pleat edge of the traditional corrugated element design. This embodiment exhibits a tendency to experience bridging in the converging edges of the pleats 98 when DE filter media is used.

FIG. 7C shows yet another pleat 98 shape in accordance with the present invention. This shape avoids the problem of bridging due to the inclusion of intermediate spaces 110 between the pleats at their bases proximate the core of the element.

Figure 8:
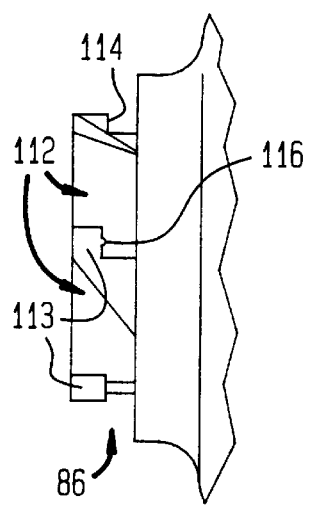
FIG. 8 is an elevational view of the piston knob locking flange of the filter shown in FIG. 2.

FIG. 8 is an enlarged elevational view of the piston knob locking flange 86 referred to above. The flange 86 has a plurality of slots 112 for receiving the locking fingers 84 that project downwardly and inwardly from the piston knob 34. The slots 112 terminating under flange segments 113 having a lower face 114 which is approximately perpendicular to the direction of piston rod 82 travel. As a result of this relative orientation, upward pressure on the piston 76 translates into pure compressive forces by the fingers 84 of the locking knob 34 upon the flange segment lower faces 114 and there is no tendency for the fingers 84 to slide relative to the flange segment lower faces 114 to unloosen the knob 34 from its locked position. The lower face 114 may incorporate a raised pimple 116 to increase the frictional interaction between the locking fingers 84 of the knob 34 and the flange 86 segments. The locking fingers 84 may also be provided with a raised pimple to engage pimple 116.

FIG. 9 shows the results of using a conventional corrugated cartridge-type element E as a DE septum, viz., when the element E is precoated with DE, there is a tendency for the DE to accumulate in the valleys of the corrugations reducing fluid flow through these areas of the septum.

Figure 10:
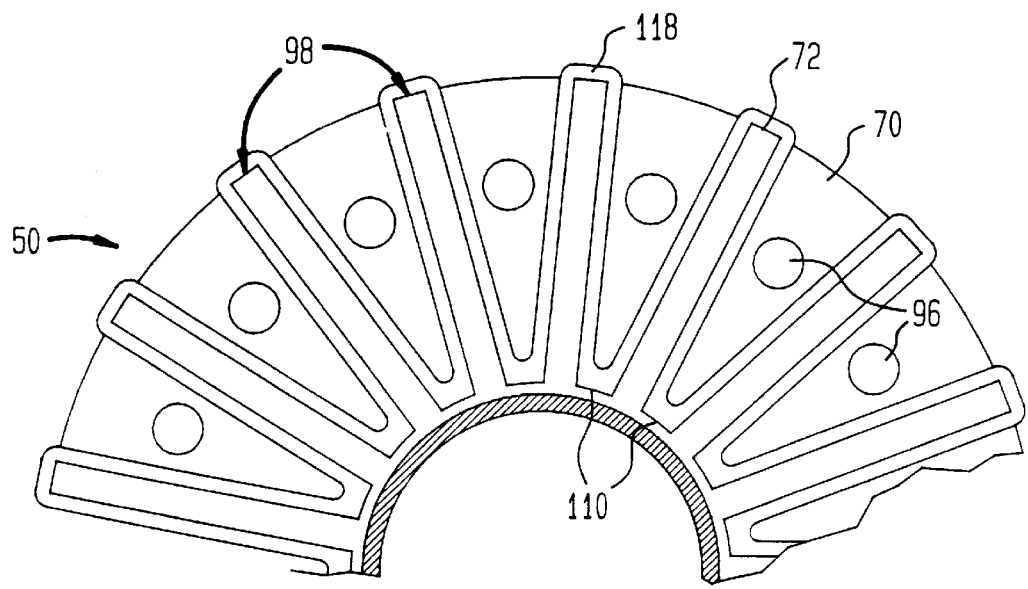
FIG. 10 is a diagrammatic, plan view of a segment of a filter element septum configuration in accordance with the present invention and precoated with diatomaceous earth.

FIG. 10 illustrates a filter element 50 utilizing a septum 72 in accordance with the present invention and coated with a DE precoat 118. Due to the link spaces 110 between successive pleats 98, DE bridging is avoided. One of the end caps 70 is also shown and includes a plurality of vent holes 96 to promote fluid flow between the septum pleats 98. Flow between the pleats helps to prevent any accumulation of DE between the pleats 98 or "bridging". The vents 96 in the bottom end cap 70 also serve as drain holes to permit DE to drain through the end cap 70 sloughing off the element 50 when the filter 10 is turned off, rather than collecting on the bottom end cap 70 between the pleats 98 in a "snow bank". This promotes keeping the DE in suspension upon restarting, which results in a higher DE-to-dirt ratio in the precoat and a thicker, more even precoat.

Figure 11:
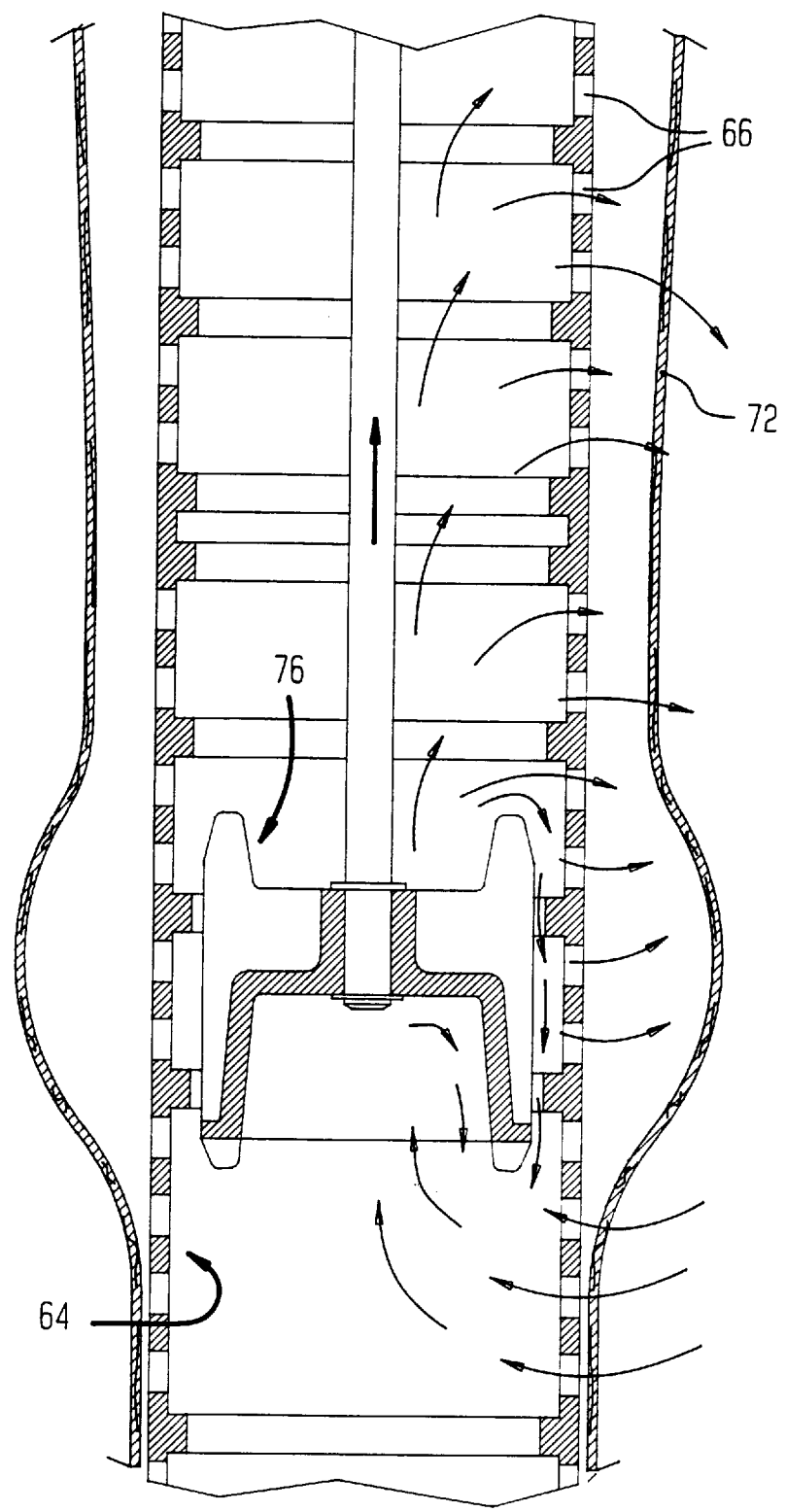
FIG. 11 is an enlarged, diagrammatic view of the media regenerator piston of the filter of FIG. 2, in operation and producing local flows of fluid through, and displacement of, the septum of the filter element of the present invention.

FIG. 11 diagrammatically depicts some of the local fluid flows that occur upon activating the regeneration piston 76. More specifically, when the piston 76 is displaced upwardly, a low pressure area is created below the piston 76. The low pressure induces a flow of fluid into the core cylinder 64 from outside the element 50 and through the septum 72. This flow pushes the septum 72 against the core cylinder 64. Above the piston 76, a high pressure condition is created, such that the fluid in the cylinder 64 is urged out through the perforations 66, through the septum 72 and out into the annular space surrounding the element 50. This flow pushes the septum 72 away from the core cylinder 64.

In addition to flows through the perforations 66 in the core cylinder 64, there is also a flow within the core cylinder 64 through the clearance space between the cylinder 64 wall and the piston 76. This flow would be in the direction from the high pressure area above the piston 76 to the low pressure area below the piston. Because there is an urging of the septum 72 toward the core cylinder 64 below the piston 76 and an urging of the septum 72 away from the core cylinder 64 above the piston 76, the septum 72 is rippled or bulged in the area of this transition, which occurs proximate the piston 76. This bulging or rippling follows the piston along its entire stroke. The return stroke has essentially the same effect and flows associated therewith, but with the flow directions reversed, due to the reversal of high and low pressure areas from one side of the piston 76 to the other.

Since the septum 72 is a deformable, resilient web or screen-like unit, ripples induced in the central portion thereof are transmitted radially throughout the entire septum. In this manner, the septum 72 can be observed to ripple or flutter as a result of the actuation of the regeneration piston 76. The rippling of the septum 72 in conjunction with flows through the core cylinder perforations 66 and septum 72 in an outward direction are effective in displacing DE precoating from the exterior surface of the septum, in that the coating is disturbed both mechanically and hydraulically.

To regenerate the DE precoat, the filter pump is turned off to relieve the fluid pressure on the filter cake. The regenerator piston is then actuated up and down to displace the DE from the septum. Upon restarting, the DE reorients itself upon the septum. A puff of DE and fine dirt can be anticipated to enter the filtered fluid stream upon restarting. If such fluid is to be recycled through the filter, the escaping puff will be filtered out in subsequent cycles. To avoid an escape puff from entering the fluid stream, the stream can be temporarily redirected back into the filter or to waste until the precoat restabilizes.

Figure 12A:
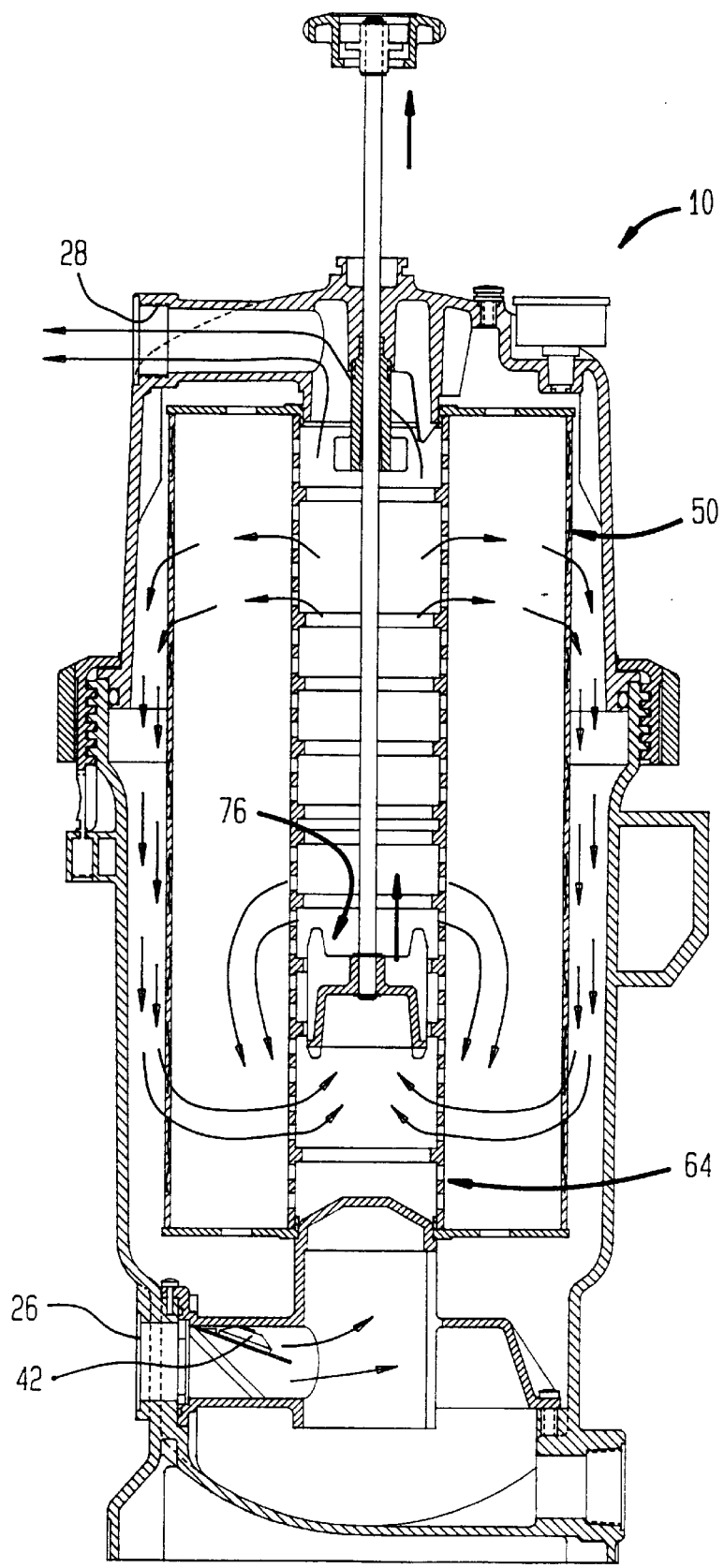
FIGS. 12A and 12B are diagrammatic views of the media regenerator piston of the filter of FIG. 2 in operation during an upstroke and downstroke, respectively, and producing flows of fluid through the filter element of the present invention and through the inlet and outlet of the filter.
Figure 12B:
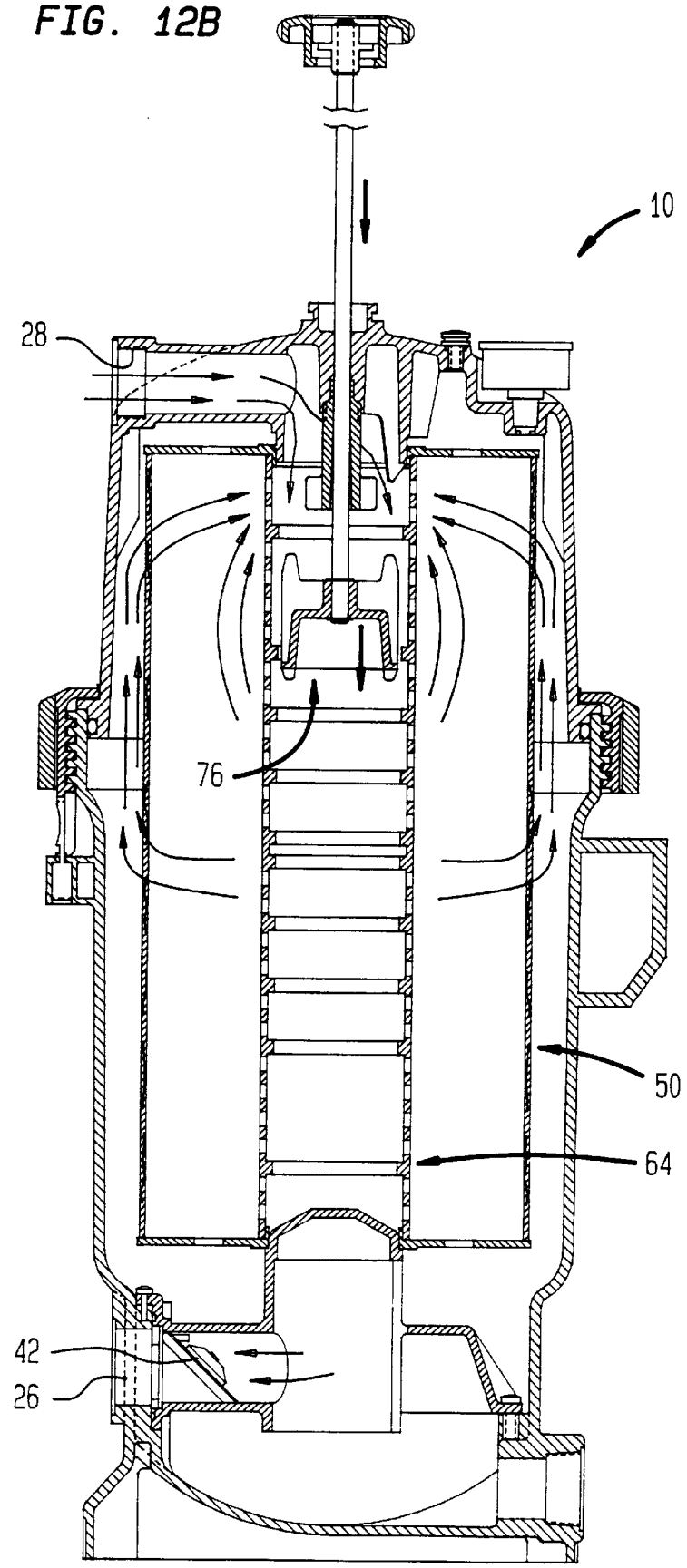

FIGS. 12A and 12B are another illustration of fluid flows within the filter 10 upon actuation of the regeneration piston 76. In 12A, the piston 76 is urged upward creating a flow out of the core cylinder 64, through the element 50 and into the annular space surrounding the element, as previously described. Below the piston 76, a low pressure area draws fluid from the annular space through the element 50 and into the core cylinder 64. As a result, an overall toroidal flow pattern is created. As noted above, there is also a flow around the piston 76 through the clearance between the piston 76 and the core cylinder 64. In addition to the above-described flows generated within the filter by regeneration, there is also a flow of fluid out the filter outlet 28 due to the pressure differential created by the piston 76 in the upper part of the filter 10. Low pressure in the bottom of the filter 10 induces the one way valve 42 to open, admitting fluid into the filter 10. The inertia of the fluid in the outlet port 28 and inlet port 26 prevent the work of the piston from resulting purely in a displacement of fluid out the outlet port 28.

FIG. 12B shows essentially the reverse flows of FIG. 12A, with the exception that the check valve 42 in the bottom of the filter 10 closes on the downstroke to prevent the loss of DE through the bottom inlet port 26.

Regeneration of the DE precoat is very effective in extending the life of the DE, thereby preventing unnecessary disposal of DE. After prolonged use, however, dirt content in the filter may become excessive, requiring the disposal of the old precoat and the application of a new one. This operation may be conducted by draining the fluid, DE and dirt from the filter 10 through the drain 30. The filter head 12 may then be disassembled from the body portion 14 by unfastening the ring 16 and the filter element 50 cleaned by hosing it down. Alternatively, the septum 72 may be subjected to a chemical bath to dissolve and dislodge contaminants therefrom. The filter 10 is reassembled and a new precoat applied.

It should be understood that the embodiments described herein are merely exemplary and that a person skilled in the art may make many variations and modifications without departing from the spirit and scope of the invention as defined in the appended claims.

I claim:

1. A fluid filter, comprising:
   (a) a hollow housing having a fluid inlet and a fluid outlet;
   (b) a filter element formed of fluid permeable material disposed within said housing for filtering fluid entering said fluid inlet passing through said element and out said fluid outlet, said element having a generally cylindrical configuration with an axial hollow, said permeable material forming a plurality of elongated, radially extending pleats, each of said pleats having a pair of side walls spaced apart along substantially the entire radial length of said pleat and terminating proximate said axial hollow, each of said pleats spaced from an adjacent said pleat where said side walls terminate proximate said axial hollow, said fluid permeable material extending circumferentially between adjacent pleats and constituting a portion of the filter element for filtering fluid; and
   (c) a piston reciprocable within said axial hollow for creating a reverse flow through said element.

2. The filter of claim 1, wherein said permeable material is disposed around a rigid, perforated, core cylinder and bounded in an axial direction on either end by a pair of disk-shaped end caps, each of said end caps having an opening therein in fluid communication with the axial hollow of said core cylinder.

3. The filter of claim 2, wherein said filter element includes a plurality of spacers inserted into a respective one of said plurality of pleats, said spacers supporting said permeable material to maintain pleat shape during operation of said filter.

4. The filter of claim 3, wherein said filter element is a septum for receiving a precoat of diatomaceous earth thereon.

5. The filter of claim 4, wherein said end caps have a plurality of vent holes therethrough, said vent holes disposed between said pleats.

6. The filter of claim 5, wherein said permeable material is polypropylene netting.

7. The filter of claim 5, wherein said end caps are formed of molded rubber.

8. The filter of claim 7, wherein said end caps are formed from urethane.

9. The filter of claim 2, wherein said filter is divided into a head portion and a body portion, said head portion and said body portion being joined by a threaded ring.

10. The filter of claim 9, wherein said threaded ring has a plurality of projections extending radially therefrom forming hand grips and said body portion has at least one hand grip extending therefrom against which a user may brace himself in turning said ring.

11. The filter of claim 9, wherein said ring is retained on said head portion by a pair of flanges.

12. The filter of claim 9, further including latch means for releasably locking said ring in selected position.

13. The filter of claim 9, further including a flow deflector disposed in said fluid inlet for redirecting said fluid in a downward direction to the bottom of said filter, said flow deflector including an integral mount for receiving said filter element.

14. The filter of claim 13, wherein said head portion includes an annular mount for receiving said filter element and a plurality of guide vanes which guide said head portion relative to said filter element during assembly to align said filter element and said annular mount.

15. The filter of claim 13, wherein said flow deflector has an air relief aperture therethrough to prevent the accumulation of pressurized air therein.

16. The filter of claim 2, wherein said core cylinder has a plurality of inwardly directed sealing flanges to seal against said piston.

17. The filter of claim 3, wherein each of said spacers has a web supporting a plurality of blades with channels therebetween for conducting fluid therethrough.

18. The filter of claim 4, wherein said piston is mounted upon a piston rod extending through said filter in coaxial alignment with said core cylinder, said piston having a diameter approximating the diameter of said core cylinder and is articulatable on said rod within said core cylinder to create flows into and out of said filter element that displace diatomaceous earth precoating on said septum.

19. The filter of claim 18, wherein said piston rod has gripping means affixed thereto at an end thereof opposite to said piston, said gripping means having means for locking said piston rod in fully inserted position.

20. The filter of claim 19, wherein said means for locking includes a plurality of fingers extending from said gripping means toward said filter and with a lower portion thereof extending inwardly to engage a mating parallel slot surface of a slot in said filter.

21. The filter of claim 4, wherein said septum is unattached to said spacers permitting a surface of said septum to move independently of said spacers.

22. The filter of claim 1, wherein each of said elongated pleats has at least three sides.

23. The filter of claim 22, wherein a central side of said at least three sides is disposed at about 90 degrees relative to each of a pair of the remaining sides.

24. The filter of claim 1, wherein said side walls of said pleats are approximately parallel, having a relative divergence from a centrally disposed line of symmetry less than 1 in 2.

25. The filter of claim 1, wherein each of said pleats has a radial length greater than 3 times the circumferential width where said sidewalls terminate proximate said axial hollow.

26. The filter of claim 1, wherein each of said pleats has a substantially flat surface at an end thereof distal to an axis of said generally cylindrical element.

27. The filter of claim 1, wherein said pleats are wedge-shaped, with said sidewalls of each pleat converging toward one another as said sidewalls approach said axial hollow.

28. The filter of claim 1, wherein said piston is double acting.

29. The filter of claim 28, wherein said piston is tapered on either end to prevent binding of said piston in said axial hollow.

30. A diatomaceous earth filter, comprising:
(a) a hollow housing having a fluid inlet and a fluid outlet;
(b) a filter septum of flexible, fluid permeable material for supporting a precoat of diatomaceous earth and disposed within said housing for filtering a pressurized stream of fluid entering said fluid inlet, passing through said precoat and said septum and out said fluid outlet, said filter septum being a generally cylindrical, pleated cartridge with a perforated core cylinder; and
(c) a piston axially reciprocable within said core cylinder to simultaneously induce flows out of said perforated core cylinder in areas approached by said piston and into said core cylinder in areas from which said piston retreats when said piston is reciprocated creating a media regenerative flow of fluid within said filter distinct from said flow attributable to said pressurized stream, said media regenerative flow disturbing said precoat on said septum at least in part by bending said flexible septum.

31. The filter of claim 30, wherein said induced flows out of and into said core cylinder displace said flexible septum away from and toward, respectively, said core cylinder.

32. The filter of claim 31, wherein said displacements of said flexible septum away from and toward said core cylinder by said induced flows impose a curved transitional shape to said septum in an area corresponding to the location of said piston.

33. The filter of claim 32, wherein said curved transitional shape accompanies said piston along its stroke and assists in dislodging diatomaceous earth precoat from said septum.

34. The filter of claim 30, wherein said piston generates a third flow of fluid from a leading side of said piston to a trailing side thereof through a clearance between said piston and said cylinder when said piston is moved in said cylinder.

35. The filter of claim 34, wherein said third flow is partially vented through said perforated core cylinder proximate said piston, said vented third flow billowing said septum proximate said piston.

* * * * *